United States Patent [19]
Ratliff

[11] Patent Number: 4,926,618
[45] Date of Patent: May 22, 1990

[54] INDUSTRIAL DEHUMIDIFIER

[76] Inventor: Charles Ratliff, 49 Ridgeway Dr., Brownsburg, Ind. 46112

[21] Appl. No.: 292,822

[22] Filed: Jan. 3, 1989

[51] Int. Cl.⁵ .............................................. B01D 53/06
[52] U.S. Cl. .......................................... 55/20; 55/60; 55/78; 55/163; 55/181; 55/208; 55/268; 55/390
[58] Field of Search .................... 55/20, 34, 60, 61, 77, 55/78, 181, 275, 390, 161–163, 267–269

[56] References Cited

U.S. PATENT DOCUMENTS

| | | | |
|---|---|---|---|
| 2,219,547 | 10/1940 | Locke | 55/390 X |
| 2,700,537 | 1/1955 | Pennington | 55/78 X |
| 2,946,201 | 7/1960 | Munters | 55/34 |
| 2,993,563 | 7/1961 | Munters et al. | 55/34 |
| 3,176,446 | 4/1965 | Siggelin | 55/34 X |
| 3,183,649 | 5/1965 | Teller | 55/179 |
| 3,470,708 | 10/1969 | Weil et al. | 62/271 |
| 3,774,374 | 11/1973 | Dufour et al. | 55/34 X |
| 3,828,528 | 8/1974 | Weil | 55/390 X |
| 3,889,742 | 6/1975 | Rush et al. | 165/7 |
| 4,012,206 | 3/1977 | Macriss et al. | 55/34 |
| 4,134,743 | 1/1979 | Macriss et al. | 55/34 |
| 4,391,616 | 7/1983 | Imamura | 55/35 |
| 4,402,717 | 9/1983 | Izumo et al. | 55/388 |
| 4,529,420 | 7/1985 | Norbäck | 55/181 |
| 4,589,892 | 5/1986 | Leonard | 55/181 X |
| 4,701,189 | 10/1987 | Oliker | 55/34 |
| 4,729,774 | 3/1988 | Cohen et al. | 55/181 |

FOREIGN PATENT DOCUMENTS

| | | | |
|---|---|---|---|
| 0051501 | 5/1982 | European Pat. Off. | 55/181 |
| 54-105841 | 8/1979 | Japan | 55/34 |
| 0035994 | 11/1979 | Japan | 55/181 |
| 57-188948 | 11/1982 | Japan | 55/181 |

*Primary Examiner*—Robert Spitzer
*Attorney, Agent, or Firm*—Woodard, Emhardt, Naughton Moriarty & McNett

[57] ABSTRACT

A dehumidification system includes a rotating bed containing a mass of thermally regenerable desiccant divided into a process sector and a regeneration sector. Process air flows through the process sector and regenerant air flows through the regeneration sector. A damper is provided for controlling the flow of the regenerant air, and a heating element is interposed between the damper and the regeneration sector to heat the regenerant air upstream of the regeneration sector. A recycle stream portion of the regenerant air is recirculated and conducted downstream of the ambient make-up air damper for at least one additional pass through the heating element and the regeneration sector. A heat exchanger is interposed between the process air downstream of the process sector of the rotating bed and the regenerant air upstream of the regeneration sector of the rotating bed for transferring heat from the process air to the regenerant air. The procss air flows through the heat exchanger to produce an increasing temperature profile along one direction in the heat exchanger, and the regenerant air flows through the heat exchanger in the direction of the increasing temperature profile. A baffle is associated with the heat exchanger having a flow resistance comparable to the flow resistance of the heat exchanger so that the flow of process sector is proportional. A master controller is provided that controls the air stream flow rates and desiccant bed wheel speed in order to fully regenerate a fixed mass of the desiccant material under any operating condition.

14 Claims, 5 Drawing Sheets

INDUSTRIAL DEHUMIDIFIER

BACKGROUND OF THE INVENTION

The present invention is concerned with a method and apparatus for drying a gas, such as air, with improved efficiency. More particularly, this invention relates to rotary desiccant systems.

In many industries, atmospheric moisture control is absolutely essential. For instance, materials in storage may be damaged by condensation of water from humid air. In addition, hygroscopic materials collect and hold moisture from the air, requiring strict humidity control procedures. For example, processes for manufacturing silicon chips for electronic circuits must be performed in a humidity controlled environment to protect the integrity of the chips.

One conventional method and apparatus for dehumidifying, or controlling the humidity of a gas, such as atmospheric air, employs a rotary sorption bed system. This system utilizes a desiccant, or an active sorbent, such as lithium chloride, or other adsorbent or absorbent materials. In the typical rotary bed dehumidifier, air that is to be dehumidified, known as process air, is passed over or through a rotating bed carrying the particular sorbent material. The sorbent material draws the humidity from the process air, and the resulting dry air is exhausted into the humidity controlled room. The sorbent material in the sorption bed passes from the process sector to the regeneration sector as the bed rotates, wherein the bed is regenerated. In the regeneration zone, regeneration air is passed over or through the desiccant material to extract the humidity from the sorbent material.

Typically the regeneration air is heated prior to entering the regeneration zone in order to increase its capacity to hold moisture and to remove moisture from the desiccant. Once the desiccant, or sorbent material, has been regenerated, it passes to the process sector as the bed rotates ready to absorb moisture from the process air. In the prior art, to control capacity the sorbent material is only partially regenerated prior to entering the process sector. This minimizes the temperature differential between the process and regeneration sectors.

In many applications of the rotary bed dehumidifier, it is necessary to cool the process air is cooled prior to being exhausted into the humidity controlled room due to the sensible heat that the process air picks up heat from the sorbent material and from the conversion of moisture content in the process air to sensible heat. In some prior art rotary bed devices, a cooling zone is added between the regeneration zone and the process zone of the rotary bed in which cool air is passed over or through the desiccant material to cool the material prior to entering the process zone.

Several attempts have been made in the prior art to improve the efficiency of the rotary bed dehumidifier. For instance, Norbäck, in U.S. Pat. No. 4,529,420, proposed recirculating the exhausted regeneration air, heating the recirculated regeneration air, and directing the recirculated air to the first of two regeneration zones of the rotary bed. Norbäck also suggests the use of a separate cooling airflow through a cooling zone interposed between the regeneration zone and the process zone of the rotary bed. In the patent to Oliker, U.S. Pat. No. 4,701,189, several recirculation paths are proposed in which the regeneration air is recirculated to increase its moisture content and, ultimately, the regeneration capacity of a given volume of air. In Macriss et al., U.S. Pat. No. 4,134,743, a heat exchanger is interposed between the dry product stream and the ambient regeneration airstream so that heat is withdrawn from the dry product and used to partially preheat the ambient regeneration air prior to entering the regeneration zone of the rotary bed.

SUMMARY OF THE INVENTION

In a dehumidification system having a rotating bed containing a mass of thermally regeneable sorbent material divided into a process sector and a regeneration sector, process air flows through the process sector and regenerant air flows through the regeneration sector. A damper is provided for controlling the flow of the regenerant air, and a heating element is interposed between the damper and the regeneration sector to heat the regenerant air upstream of the regeneration sector. A recycle stream portion of the regenerant air is recirculated and conducted downstream of the damper for at least one additional pass through the heating element and the regeneration sector.

In one aspect of the invention, a heat exchanger is interposed between the process air downstream of the process sector of the rotating bed and the regenerant air upstream of the regeneration sector of the rotating bed for transferring heat from the process air to the regenerant air. The process air flows through the heat exchanger to produce an increasing temperature profile along one direction in the heat exchanger, and the regenerant air flows through the heat exchanger in the direction of the increasing temperature profile. A baffle is associated with the heat exchanger having a flow resistance comparable to the flow resistance of the heat exchanger so that the flow of process air through a first hottest portion of the process sector of the rotating bed is generally equal to the flow of process air through a second coolest portion of the process sector.

In another aspect of the invention, a controller is provided that receives as inputs signals corresponding to the temperature of the regeneration air stream downstream of the regeneration sector, and to the humidity of the process air upstream of the process sector. The controller continuously compares the inputs to a number of predetermined set points during the operation of the sorption bed system. The controller generates a plurality of output signals, in response to the comparison between the inputs and the number of set points, to simultaneously control the speed of rotation of the sorption bed, the temperature of the regeneration air and the quantities of make-up and recycle air in order to achieve full bed regeneration at all load conditions and bed speeds.

It is one object of the present invention to provide an industrial dehumidifier that is more energy efficient than those presently known and used. It is a further object to reduce the desiccant wheel rotational speed and the quantity of ambient make-up air required for complete regeneration of the desiccant bed and optimum operation of the dehumidifier at all load conditions, and particularly at no load conditions.

Yet another object and benefit of the dehumidifer of the present invention is that it provides a more efficient apparatus and method for heating ambient make-up air used in regenerating the desiccant bed and for cooling the output process air entering the humidity controlled environment. The provision of an automatic control for the industrial dehumidifier is a further object, particularly for operating the dehumidifier between no load and full load conditions. Other objects and benefits of the invention will be apparent from the following description and accompanying figures.

BRIEF DESCRIPTION OF THE DRAWINGS

FIG. 4b is a schematic representation of a typical industrial dehumidifier of the prior art with theoretical values for the load conditions illustrated in FIG. 4a.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
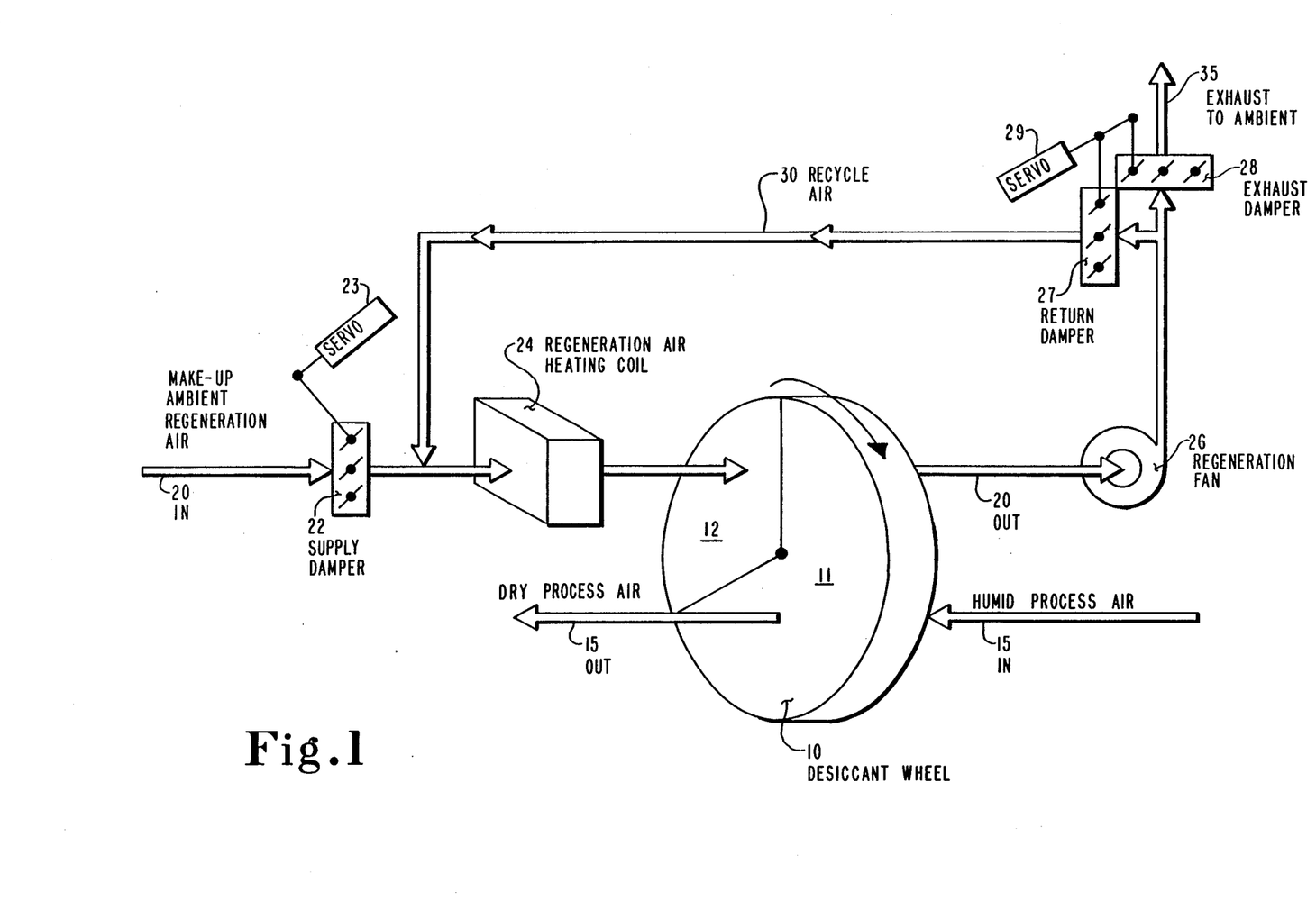
FIG. 1 is a schematic representation of the apparatus of one embodiment of the present invention in use with a rotating sorption bed system.

Referring first to FIG. 1, one aspect of the present invention includes a rotary sorption bed 10 containing a mass of thermally regenerable sorbent material that is divided in a conventional manner into a process sector 11 and a regeneration sector 12. The sorbent material may be a desiccant such as silica gel, and the rotary sorption bed 10 may be a honeycomb desiccant bed, or a segmented carousel desiccant bed, both of which are known in the art. Humid process air $15_{IN}$ enters the process sector 11 in which moisture in the process air is removed by a desiccant material. The dry process air $15_{OUT}$ is exhausted into the workspace. As the desiccant wheel 10 rotates, desiccant material moves from the process sector 11 to the regeneration sector 12. Regenerant, or make-up, air $20_{IN}$, typically at ambient temperature and pressure, is directed through the regeneration sector 12 in a conventional manner to withdraw the moisture from the desiccant material. In the present aspect of the invention, a supply, or make-up, air damper 22 is controlled by a servo mechanism 23 to control the amount of regenerant make-up air passing into the regeneration sector 12. The quantity of regenerant make-up air is controlled to replace exhaust air discharged from the system, as will be described more fully herein. The regenerant air $20_{IN}$ is preheated by a heating element 24, which may be a heating coil such as a steam coil, in order to increase its moisture carrying capacity. Once the regenerant air has absorbed the moisture from the desiccant material, the output, or downstream, regenerant air $20_{OUT}$ is drawn by a regeneration fan 26 toward a second set of dampers.

In the present invention, a return damper 27 controls the quantity of downstream regenerant air $20_{OUT}$ that is directed along a recirculation path. Exhaust damper 28 controls the quantity of output regenerant air that is exhausted as waste product 35. In the preferred embodiment, a servo mechanism 29 controls both the return damper 27 and the exhaust damper 28 so that the two dampers are simultaneously inversely operated—that is, as the servo mechanism is stroked in one direction, the return damper is opened while the exhaust damper is closed. Similarly, stroking the servo mechanism 29 in the opposite direction closes the return damper 27 and opens the exhaust damper 28. The servo mechanism 29 may be replaced by two servo mechanisms that individually control each of the two dampers. In this instance, the two servos are linked in complimentary fashion so that when one servo opens damper 27 the other servo closes damper 28.

Output downstream regenerant air $20_{OUT}$ passing through the return damper 27 constitutes recycle, or recirculation, air 30 that is directed back to be combined with the ambient regenerant air $20_{IN}$ upstream of the heating element 24. The warm recycle air 30 increases the temperature of the airstream entering the heating coil. The heating element 24 increases the temperature of the regenerant air even further prior to entering the regeneration sector 12. In this manner, a given quantity of regenerant air is continuously recirculated and reheated to increase its moisture carrying capability. The amount of recirculation air directed back into the regenerant airstream, as well as the mixture of ambient air and recirculation air making up the regenerant airstream, is controlled by supply damper 22, return damper 27, and exhaust damper 28. For instance, partially closing supply damper 22 decreases the quantity of ambient regenerant air, which increases the ratio of recycle air to ambient air that is heated by the heating element 24 prior to entering the regeneration sector 12. The regenerant recycle air entering the regeneration sector will continue to increase in temperature so long as the supply damper 22 is closed to prevent mixing with cooler ambient regenerant air, or until the regeneration temperature controller stops the temperature rise at some pre-determined set point.

The quantity of recycle air 30 that is mixed with the ambient regenerant air $20_{IN}$ can also be controlled by way of the return damper 27 and exhaust damper 28 actuated by the common servo mechanism 29. Closing the return damper 27 eliminates the recycle air and directs all of the output regenerant air $20_{OUT}$ to the waste airstream 35. Likewise, closing the exhaust damper 28, which opens the return damper 27, directs all of the output regenerant air $20_{OUT}$ into the recirculation airstream 30.

The two servo mechanisms 23 and 29 can be linked to a common controller that determines the damper settings based upon the condition of the process air $15_{IN}$, the ambient regenerant air $20_{IN}$, and the desired conditions of the dry process air $15_{OUT}$. Similarly, the regeneration fan 26 can be linked to the same controller so that the on/off state of the fan is controllable. Alternatively, the speed of the fan, and consequently the speed of the regenerant airflow, can be controlled. With the recirculation path and dampers of this aspect of the present invention, the recycle airflow in the recirculation loop 30 can be varied between 0% and 100% of the regenerant air, the remainder being exhausted as waste. In the preferred embodiment, the recirculation airstream 30 is limited to 50% of the total downstream regenerant air $20_{OUT}$, or the total regeneration fan capacity, at full load. Under no load conditions, the recycle airstream is at 100%—that is, the return damper 27 is fully open while the exhaust damper 28 is fully closed. The array of dampers, and the recirculation air loop of the present invention, eliminates the need for the number of separate recirculation sections in the regeneration loop that is present in devices of the prior art, such as the apparatus described in the Norbäck reference. Maintaining the quantity of recycle air 30 at 50 percent of total downstream regenerant air optimizes the moisture bearing capability of the regenerant air relative to the increase in temperature of the desiccant material in the regeneration sector.

Figure 2A:
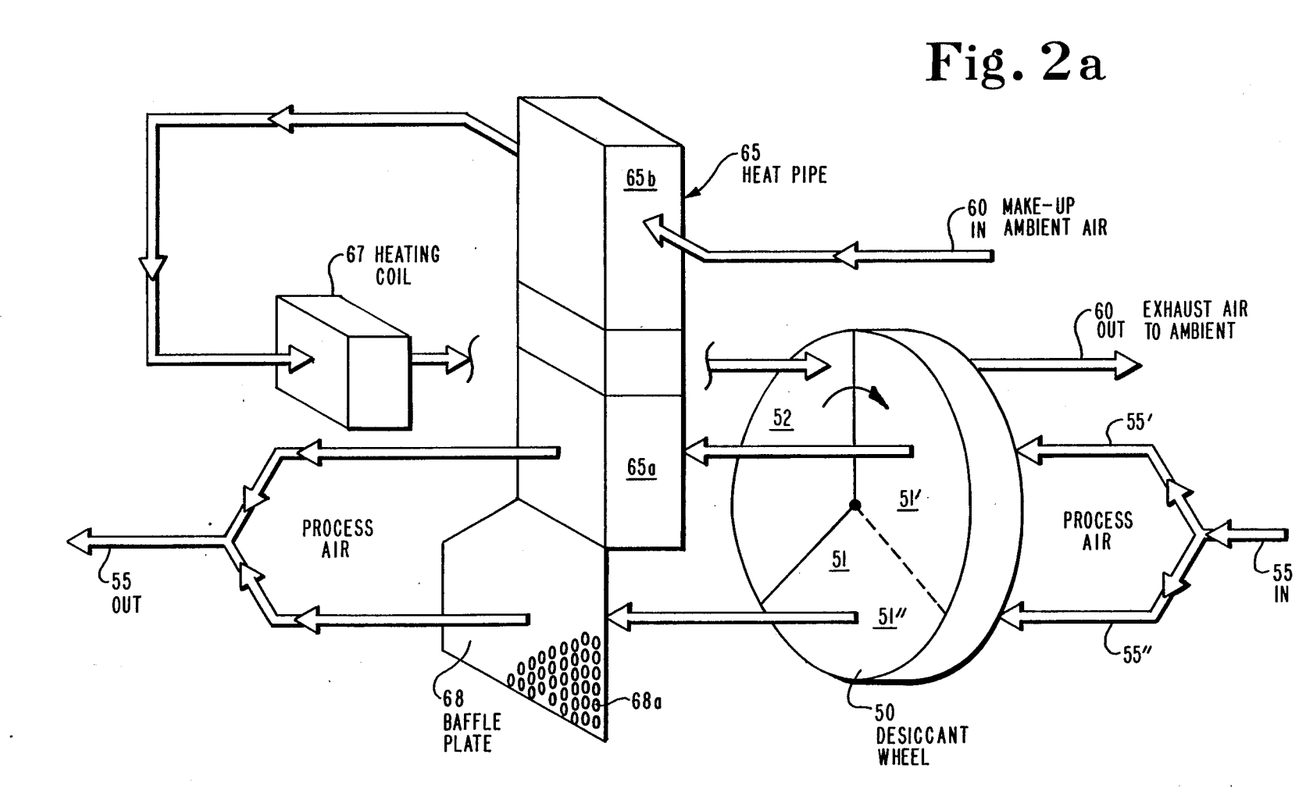
FIG. 2a is a schematic representation of the apparatus of another embodiment of the present invention in use with a rotating sorption bed system.
Figure 2B:
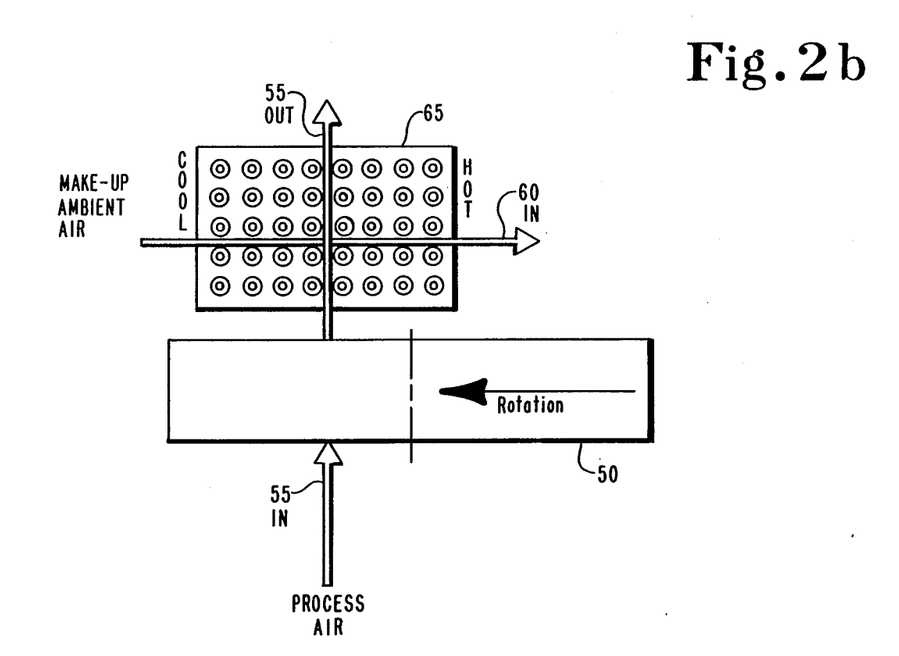
FIG. 2b is a schematic representation of the heat exchanger of the embodiment shown in FIG. 2a showing the fluid flow paths with respect to the temperature profile of the heat exchanger.

Another aspect of the present invention is represented in FIGS. 2a-2b. A desiccant wheel 50 includes a process sector 51 and a regeneration sector 52. Process air $55_{IN}$ is directed to the process sector 51. By way of illustration only, the process air $55_{IN}$ is shown as being split into two airstreams 55' and 55''. A heat exchanger 65, such as a heat pipe, is situated immediately adjacent the desiccant wheel 50 at the downstream side of the process sector 51. The process end 65a of the heat exchanger 65 is oriented adjacent the hottest portion of the process sector, that is the portion immediately downstream of the regeneration sector 52. Thus, process air in the upperstream 55' passes through the warmest portion 51' of the process sector 51 where the process air picks up heat from the desiccant material. Since the temperature of the process air leaving the warmest portion 51' of the process sector 51 is typically too high for a normal working condition, it is necessary to cool the dry process air prior to directing that air into the workspace. The heat exchanger 65 provides a means to extract a certain amount of heat energy from the output process air $55_{OUT}$ to cool the air for discharge into the workspace.

The lower stream 55'' of the input process air $55_{IN}$ passes through the cooler portion 51'' of the process sector 51. Since the desiccant material is sufficiently cool by the time it reaches the portion 51'', there is no need to pass this airstream 55'' through the heat exchanger. However, the lower process airstream 55'' is passed through a baffle plate 68 prior to combining with the upper stream 55' to form the dry output process air $55_{OUT}$. The baffle plate 68 includes a plurality of apertures 68a calibrated to provide the same airflow resistance as the resistance of the heat pipe 65. It is necessary to match the airflow resistances between the heat pipe and the baffle plate in order to insure that the process airstream $55_{IN}$ is proportionally divided between the upper stream 55' and the lower stream 55''. Without the baffle plate, the process air would follow the path of least resistance and avoid traveling through the process sector 51' and the process end 65a of the heat pipe 65.

As in a typical rotary bed dehumidifier, ambient air $60_{IN}$ is provided to the regeneration sector 52 to absorb the moisture contained in the desiccant material, to be discharged as air $60_{OUT}$. A heating element 67, such as a heating coil, is provided to heat the ambient air $60_{IN}$ prior to entering the regeneration sector 52 in order to increase the moisture carrying capability of the regenerant air. Unlike a typical rotary bed dehumidifier, however, applicant's dehumidifier system includes an upper end 65b of the heat pipe through which the ambient air $60_{IN}$ is passed. Heat energy is passed along the heat exchanger 65 from the process or hot end 65a to the ambient or upper end 65b. The ambient air $60_{IN}$ picks up some of this heat energy from the end 65b of the heat pipe so that the regenerant air is preheated prior to passing through the heating element 67.

In a novel aspect of the present invention, the ambient air $60_{IN}$ is passed through the heat pipe in a cross-flow arrangement, as illustrated in FIG. 2b. Thus, the regenerant air $60_{IN}$ flows from the cooler side of the end 65b of the heat pipe 65 to the hotter side. This cross-flow arrangement is more efficient than the counter flow arrangements in prior art devices, such as that described in the Macriss et al. patent, because the entire regenerant airflow passes over the hottest part of the heat exchanger. In the prior art devices, the ambient regenerant air flows counter, and generally parallel, to the process air so that some portion of the ambient air passes over the coolest section of the heat exchanger and another portion of the process air passes over the hottest section of the heat exchanger. The cross-flow aspect of the present invention becomes more important at low wheel speeds and with low recycle air quantities to insure that the ambient regenerant make-up air is preheated sufficiently prior to entering the regeneration sector 52.

Figure 3:
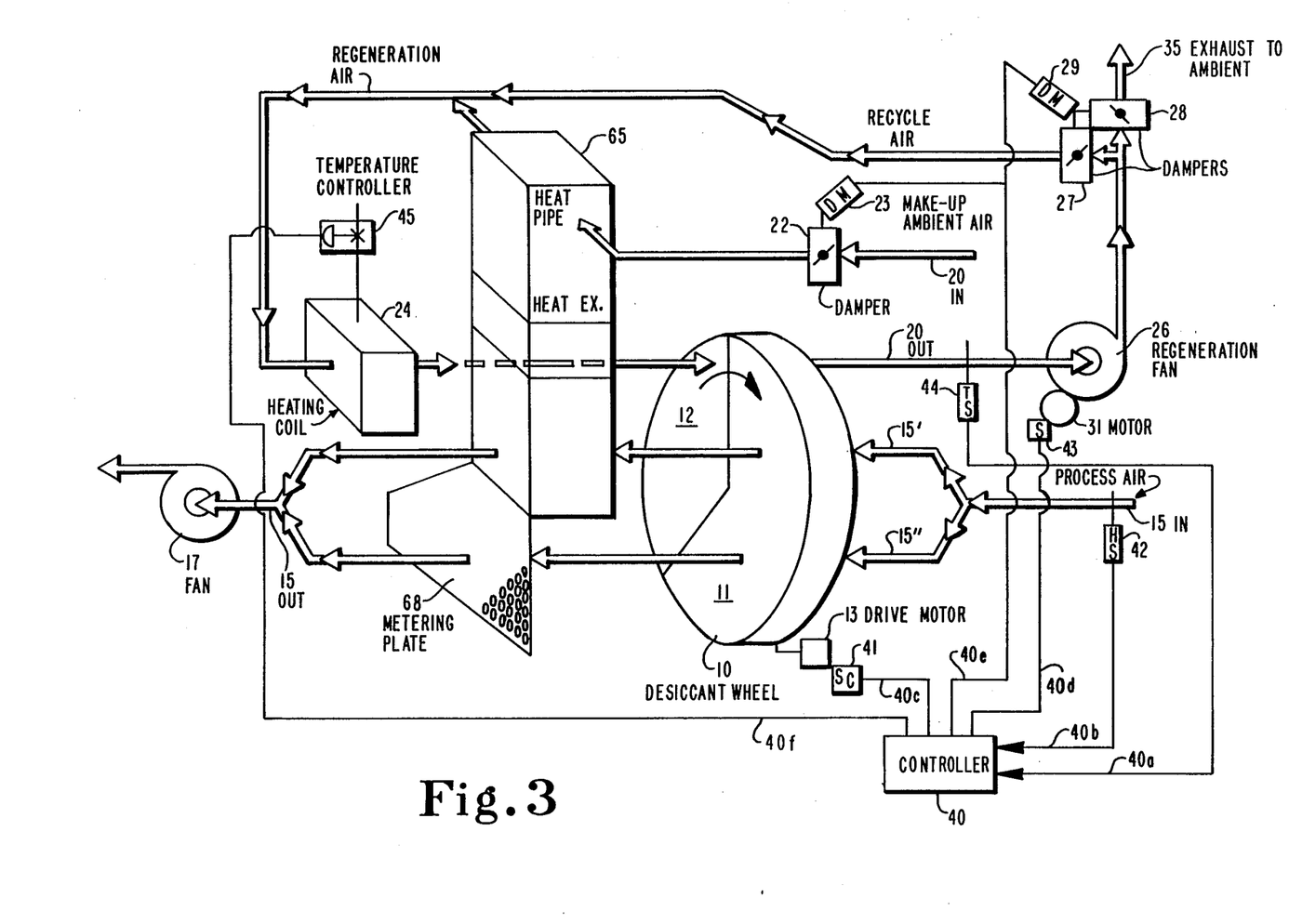
FIG. 3 is a schematic representation of the control system of the present invention.

The industrial dehumidifier of the present invention is adapted for use with a fully integrated controller system, as illustrated in FIG. 3. The rotary bed dehumidification system shown in FIG. 3 is identical to the system described with reference to FIG. 1, with the addition of the heat exchanger 65 and baffle 68 illustrated in FIG. 2a. The desiccant wheel 10 is driven by a motor 13, and the regeneration fan 26 is driven by a motor 31. The integrated control system includes a master controller 40 having inputs 40a and 40b and outputs 40c-40f. The input line 40a is connected to a thermostat 44 that is situated at the downstream, or output, side of the regeneration sector 12 of the desiccant wheel 10. The thermostat 44 measures the temperature of the output regenerant air $20_{OUT}$. Input line 40b to the master controller 40 is connected to a humidistat 42 that is situated to measure the humidity of the upstream, or input, process air $15_{IN}$.

The master controller 40 receives the temperature and humidity signals from the thermostat 44 and humidistat 42, respectively, in order to establish the state of the control signals output along output lines 40c-40f. Output 40c is connected to a speed controller 41 that controls the speed of the desiccant wheel motor 13, thereby controlling the rate of rotation of the desiccant wheel 10. Output 40d is connected to a motor switch 43 which turns the regeneration fan motor 31 off and on. Output 40e is linked to simultaneously control each of the dampers 22, 27, and 28. A signal from output 40e is fed to the servo mechanisms controlling these dampers, namely servo mechanism 23, and 29. Finally, output line 40f is connected to a temperature controller 45 which controls the temperature of the heating element 24. The nature of the temperature controller 45, whether electric, gas, or steam, depends upon the type of heating element 24 used in the dehumidification system.

In the preferred embodiment, the master controller 40 is a programmable electronic controller. Signals along inputs 40a-b and outputs 40c-f may be analog or digital, depending upon the nature of the control device receiving the signal. For instance, if the rotary bed 10 is a segmented carousel bed, signals to the speed controller 43 could be digital to control a digital stepping motor so that the carousel bed may be step indexed between segments.

The object of the control system shown in FIG. 3 is to match the mass of desiccant that is regenerated to the process humidity load. In the rotary bed dehumidifiers of the prior art, the object has been to partially regenerate the entire desiccant mass to match the process humidity load. In the present invention, the master controller 40 controls the dampers, the heating element, the regenerant airflow, and the speed of the desiccant wheel, so that some proportion of the total mass of desiccant is completely regenerated as required based upon the humidity of the process air $15_{IN}$. In other words, the master controller 40 controls the wheel speed, the regeneration temperature, and the regenerant air recycle, or recirculation, quantity in order to achieve maximum thermal efficiency in the dehumidifier of the present invention.

The control system of the present invention is set up to fully regenerate the desiccant bed at the minimum wheel speed, with a minimum amount of make-up air and at a minimum regenerant air temperature. The master controller 40 includes predetermined, or preprogrammed, set points corresponding to the optimum operating condition for the dehumidification system. Under no load conditions, the desiccant wheel is being driven at a minimum speed. The return damper 27 and the exhaust damper 28 are closed, and the heating element 24 is off. At no load condition, there is no need to regenerate the desiccant wheel, so the regeneration and recirculation loops can be deactivated. As the humidistat 42 senses a rise in the process air humidity, the master controller 40 compares the humidity value with a set point value. When the process air humidity reaches the set point, the motor switch 43 is turned on so that the regeneration fan 26 is energized. As the humidity sensed by the humidistat 42 continues to rise, the temperature controller 45 is energized to turn the heating element 24 on, the dampers 22 and 28 are opened to a minimum setting and return damper 27 is nearly fully open to allow recycle air to flow in the recirculation path 30. In this condition, the temperature in the recirculation loop steadily increases and is monitored by the thermostat 44 to be maintained at the optimum temperature setting for the humidity of the process air.

As the humidity in the process air increases, the temperature in the recirculation loop is increased by the controller. The dampers 22, 27 and 28 are appropriately stroked to decrease the amount of recycle air from 100% of the regeneration airflow in order to prevent excess moisture build-up in the recirculation loop. In addition, the master controller 40 sends a signal to the speed controller 41 to increase the speed of rotation of the desiccant wheel 10. Finally, at full load condition, the desiccant wheel is running at its maximum speed and the regeneration temperature is at its maximum control point. The recycle air damper 27 is at its minimum flow position. As the humidity of the process air decreases, the above steps are reversed.

In a dehumidifier with a segmented carousel desiccant bed, the method for controlling this humidifier system is basically the same as described above except that the wheel speed is step indexed at variable time elements as full regeneration of the desiccant is achieved. An additional step in the control sequence could be inserted to cool the regeneration section a few seconds before the carousel bed is indexed. This allows the hot reactivated bed to cool before it is indexed which, in turn, reduces the thermal shock as the hot/warm reactive desiccant is passed from regeneration to process sections, and from the process section to the regeneration section. In order to achieve this step in the control sequence, the heating element is turned off for a short period of time and the dampers are adjusted to cool the desiccant before the indexing cycle is started.

Figure 4A:
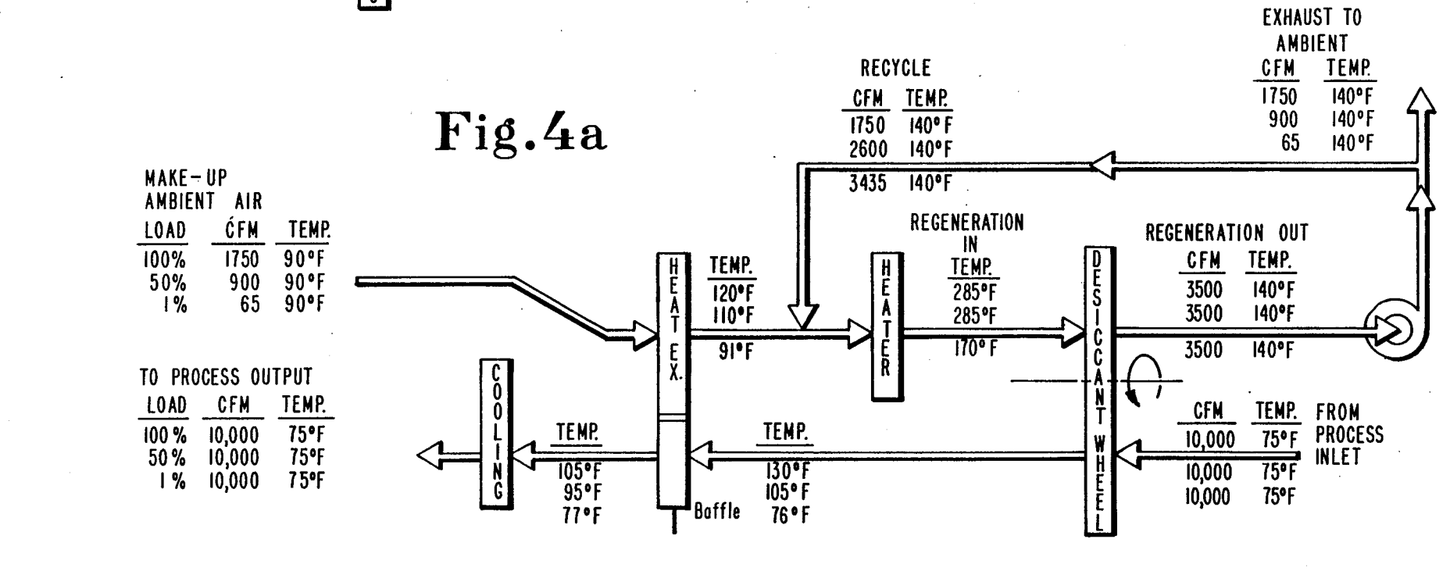
FIG. 4a is a schematic representation of the industrial dehumidifier of the third embodiment with theoretical fluid flow rates and temperatures at different load conditions.
Figure 4B:
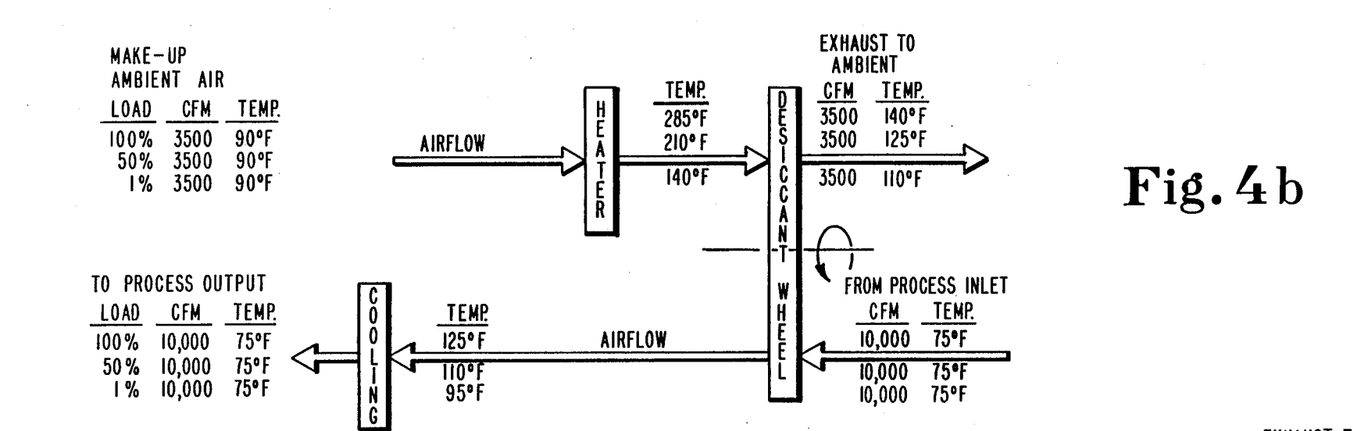

Referring now to FIGS. 4a and 4b, the performance of the industrial dehumidifer of the prior art, with respect to fluid flow rates and temperatures. It is assumed that the fluid is air and that the process air flow through both dehumidifiers is 10,000 c.f.m. (cubic feet per minute) and the regeneration outlet air flow is 3500 c.f.m. It is stressed that the values shown in FIGS. 4a and 4b are for illustration only and will naturally vary with equipment size and application.

Nevertheless, a comparison of the dehumidifier of the present invention in FIG. 4a with the prior art dehumidifier of FIG. 4b reveals the lower ambient make-up air requirements for Applicant's invention. For Applicant's device of FIG. 4a, it is assumed that the regeneration air is recycled only once so that the ambient make-up air requirement is 50% of the maximum possible make-up air requirement demonstrated by the prior art device of FIG. 4b. However, for two recycles of regeneration air, the ambient make-up air requirement for Applicant's device can be reduced to 33% of the maximum make-up air, or 1166 c.f.m. in the present example. In addition, the temperature of the process air just prior to cooling is 15°-20° lower in the present invention, which translates to lower cooling requirements for Applicant's dehumidifer over prior art devices. Finally, Applicant's device exhausts less waste air to ambient than the prior art device.

A comparison of the theoretical energy requirements between Applicant's dehumidifier of FIG. 4a and the prior art device of FIG. 4b, at a desiccant wheel speed of 17 revolutions per hour, shows an improvement at all load conditions. At no-load or near no-load conditions, Applicant's dehumidifier recycles nearly all of the regeneration output air to improve the energy efficiency of the system nearly 90% over the prior art device (by reducing the total BTUs required for regeneration and cooling from 18 BTUs to about 2 BTUs). At full load conditions, the present system reduces the total BTU requirements for dehumidification by about 15%, from 85 BTUs to about 72 BTUs, even with the cooling load requirements included. The industrial dehumidifier of the present invention provides a more energy efficient system than the typical systems of the prior art.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A method of operating a rotating sorption bed system having a mass of thermally regenerable sorbent material divided into a process sector and a regeneration sector, said method comprising the continuous steps of:
   flowing a process fluid stream through the process sector;

controllably flowing a regenerant fluid stream through the regeneration sector to regenerate the sorbent material;

controllably heating the regenerant fluid stream upstream of the regeneration sector;

controllably recirculating a variable recycle stream portion of the regenerant fluid stream downstream of the regeneration sector for at least one additional pass through the regeneration sector.

2. The method of operating a rotating sorption bed system of claim 1, wherein said step of controllably recirculating includes mixing said recycle stream portion with said regenerant fluid stream prior to controllably heating the regenerant fluid stream.

3. The method of operating a rotating sorption bed system of claim 1, wherein said step of controllably recirculating a variable recycle stream portion of the regenerant fluid stream includes recirculating a percentage of the regenerant fluid stream downstream of the regeneration sector as said recycle stream portion under full load conditions, said percentage being determined by the number of the additional passes of the regenerant fluid through the regeneration sector but no greater than 50%, and recirculating approximately 100% of the regenerant fluid stream downstream of the regeneration sector under no load conditions.

4. The method of operating a rotating sorption bed system of claim 1, wherein said step of controllably recirculating a recycle stream portion of the regenerant fluid stream includes the continuous steps of:

monitoring the temperature of the regenerant fluid stream downstream of the regeneration sector; and controlling the number of additional passes through the regeneration sector based upon the temperature of the regenerant fluid stream downstream of the regeneration sector.

5. The method of operating a rotating sorption bed system of claim 1, wherein said step of controllably heating the regenerant fluid stream upstream of the regeneration sector includes the continuous steps of:

monitoring the temperature of the regenerant fluid stream downstream of the regeneration sector; and controlling the amount of heat added to the regenerant fluid stream based upon the temperature of the regenerant fluid stream downstream of the regeneration sector to assure that a temperature for the optimum regeneration of the sorbent material has been achieved.

6. A method of operating a rotating sorption bed system from no load to full load condition, the sorption bed having a mass of thermally regenerable sorbent material divided into a process sector and a regeneration sector, said method comprising the steps of:

flowing a process fluid stream through the process sector; and monitoring the humidity of the process fluid stream;

rotating the sorption bed at a minimum first speed during no load conditions;

when the process fluid stream humidity rises to a first pre-determined value, flowing a heated regenerant fluid stream through the regeneration sector;

as the process fluid stream humidity rises from said first value to a second pre-determined value;

flowing a decreasing portion of the regenerant fluid stream downstream of the regeneration sector in a recirculation loop for at least one additional pass through the regeneration sector; and increasing the speed of rotation of the sorption bed to an intermediate second speed in proportion to the rise in the process fluid stream humidity;

monitoring the temperature of the regenerant fluid stream downstream of the regeneration sector;

as the process fluid stream humidity rises from said second value to a third full-load value;

increasing the speed of rotation of the sorption bed from said intermediate second speed to a maximum third speed; and decreasing the portion of regenerant fluid stream in said recirculation loop to a percentage of the regeneration fluid stream, the percentage being determined by the number of additional passes of the regenerant fluid stream through the regeneration sector, but no greater than 50%; and controlling the temperature of the regenerant fluid stream at a temperature for optimum regeneration of the sorption bed.

7. A method of operating a rotating sorption bed system having a mass of thermally regenerable sorbent material divided into a process sector and a regeneration sector, said method comprising the continuous steps of:

flowing a process fluid stream through the process sector; and monitoring the humidity of the process fluid stream;

flowing a regenerant fluid stream, including a make-up ambient fluid portion, through the regeneration sector;

flowing a recycle portion of the regenerant fluid stream downstream of the regeneration sector in a recirculation loop for at least one additional pass through the regeneration sector;

in response to the sensed humidity of the process fluid stream, continuously controlling the speed of rotation of the sorption bed, the flow of the recycle portion and make-up portion of regeneration fluid, and the temperature of the regenerant fluid stream downstream of the regeneration sector, whereby the sorption bed is fully regenerated in the regeneration sector.

8. An apparatus for use with a dehumidification system having a rotating bed containing a mass of thermally regenerable sorbent material divided into a process sector and a regeneration sector, means for flowing a process fluid stream through the process sector, and means for flowing a regenerant fluid stream through the regeneration sector of the rotating bed, comprising:

a damper for controlling the flow of the regenerant fluid stream upstream of the regeneration sector;

a heating element interposed between said damper and the regeneration sector to heat the regenerant fluid stream upstream of the regeneration sector;

recirculation means downstream of the regeneration sector for recirculating a recycle stream portion of the regenerant fluid stream; and means for conducting said recycle stream portion downstream of said damper for at least one additional pass through said heating element and the regeneration sector.

9. The apparatus of claim 8, wherein said recirculation means includes:

flow dividing means for dividing the flow of the regenerant fluid stream downstream of the regeneration sector into said recycle stream portion and a waste stream portion to be exhausted, said flow dividing means including;

an exhaust damper through which said waste stream portion flows;

a return damper through which said recycle stream portion flows; and means for simultaneously inversely opening and closing each of said exhaust damper and said return damper.

10. An apparatus for use with a dehumidification system having a rotating bed containing a mass of thermally regenerable sorbent material divided into a process sector and a regeneration sector, means for flowing a process fluid stream through the process sector, and means for flowing a regenerate fluid stream through the regeneration sector of the rotating bed, comprising:

a linear heat exchanger having a plurality of heat pipes between the process fluid stream downstream of the process sector of the rotating bed and the regenerate fluid stream upstream of the regeneration sector of the rotating bed for transferring heat from the process fluid stream to the regenerate fluid stream;

first means for flowing the process fluid stream through said heat exchanger to produce an increasing temperature profile along one direction generally perpendicular to the linear direction of said heat exchanger; and second means for flowing the regenerate fluid stream through said heat exchanger in said one direction of said increasing temperature profile.

11. An apparatus for use with a dehumidification system having a rotating bed containing a mass of thermally regenerable sorbent material divided into a process sector and a regeneration sector, means for flowing a process fluid stream through the process sector, and means for flowing a regenerate fluid stream through the regeneration sector of the rotating bed, comprising:

a heat exchanger between the process fluid stream downstream of the process sector of the rotating bed and the regenerate fluid stream upstream of the regeneration sector of the rotating bed for transferring heat from the process fluid stream to the regenerate fluid stream;

first means for flowing the process fluid stream through said heat exchanger to produce an increasing temperature profile along one direction in said heat exchanger;

second means for flowing the regenerate fluid stream through said heat exchanger in said one direction of said increasing temperature profile; and a baffle associated with said heat exchanger, said baffle having a flow resistance comparable to the flow resistance of said heat exchanger, wherein said heat exchanger is oriented adjacent a first hottest portion of the process sector of the rotating bed, and said baffle is oriented adjacent a second coolest portion of the process sector, whereby the proportion of the process fluid stream flowing through each of said first hottest portion and said second coolest portion of the process sector is directly related to the ratio of the flow resistance of said heat exchanger to the flow resistance of said baffle.

12. A dehumidification system for use with a dehumidification system having a rotating bed containing a mass of thermally regenerable sorbent material divided into a process sector and a regeneration sector, means for flowing a process fluid stream through the process sector, and means for flowing a regenerate fluid stream through the regeneration sector of the rotating bed, comprising:

a heat exchanger between the process fluid stream downstream of the process sector of the rotating bed and the regenerate fluid stream upstream of the regeneration sector of the rotating bed for transferring heat from the process fluid stream to the regenerate fluid stream;

first means for flowing the process fluid stream through said heat exchanger to produce an increasing temperature profile along one direction in said heat exchanger;

second means for flowing the regenerate fluid stream through said heat exchanger in said one direction of said increasing temperature profile;

wherein said one direction is perpendicular to the direction of the flow of the process fluid stream through said heat exchanger.

13. An apparatus for use with a dehumidification system having a rotating bed containing a mass of thermally regenerable sorbent material divided into a process sector and a regeneration sector, means for flowing a process fluid stream through the process sector, and means for flowing a regenerant fluid stream through the regeneration sector of the rotating bed, comprising:

a heat exchanger between the process fluid stream downstream of the process sector of the rotating bed and the regenerant fluid stream upstream of the regeneration sector of the rotating bed for transferring heat from the process fluid stream to the regenerant fluid stream;

a baffle associated with said heat exchanger, said baffle having a flow resistance comparable to the flow resistance of said heat exchanger, wherein said heat exchanger is oriented adjacent a first hottest portion of the process sector of the rotating bed, and said baffle is oriented adjacent a second coolest portion of the process sector, whereby the proportion of the process fluid stream flowing through each of said first hottest portion and said second coolest portion of the process sector is directly related to the ratio of the flow resistance of said heat exchanger to the flow resistance of said baffle.

14. A dehumidification system comprising:

a rotatably mounted bed containing a mass of thermally regenerable sorbent material divided into a process sector and a regeneration sector;

first means for flowing a process fluid stream through the process sector;

second means for controllably flowing a regenerant fluid stream through the regeneration sector;

a controllable heating element interposed in said regenerant fluid stream upstream of the regeneration sector to heat said regenerant fluid stream;

flow divider means for controllably dividing said regenerant fluid stream downstream of said regeneration sector into a waste stream portion and a recycle stream portion;

recirculation means for recirculating said recycle stream for at least one additional pass through said heating element and through said regeneration sector;

a thermostat for sensing the temperature of said regeneration fluid stream downstream of said regeneration sector;

a humidistat for sensing the moisture content of said process fluid stream upstream of said process sector; and a controller receiving as inputs said sensed temperature and said sensed humidity, and producing as outputs a plurality of signals for controlling each of said first means, said second means, said heating element, and said flow divider means, said controller including;

means for continuously comparing said inputs to a number of predetermined set points; and means for simultaneously modifying each of said plurality of output signals in response to the comparison between said inputs and said number of set points.

* * * * *

UNITED STATES PATENT AND TRADEMARK OFFICE
CERTIFICATE OF CORRECTION

PATENT NO. : 4,926,618
DATED : May 22, 1990
INVENTOR(S) : Charles Ratliff

It is certified that error appears in the above-identified patent and that said Letters Patent is hereby corrected as shown below:

In column 8, line 11 please insert after "dehumidifer of the" -- present invention is compared to the performance of a typical dehumidifer of the --.

Signed and Sealed this

Twenty-third Day of July, 1991

Attest:

HARRY F. MANBECK, JR.

Attesting Officer

Commissioner of Patents and Trademarks